United States Patent [19]

Boisgontier et al.

[11] Patent Number: 4,984,866
[45] Date of Patent: Jan. 15, 1991

[54] COUPLING DEVICE BETWEEN IN OPTICAL FIBER AND AN OPTO-ELECTRONIC COMPONENT

[75] Inventors: Jean Marc Boisgontier, Les Essarts le Roi; Christian Caville, Paris, both of France

[73] Assignee: Societe Anonyme dite: Alcatel CIT, Paris, France

[21] Appl. No.: 525,206

[22] Filed: May 18, 1990

Related U.S. Application Data

[63] Continuation of Ser. No. 269,399, Nov. 10, 1988, abandoned.

[30] Foreign Application Priority Data

Nov. 13, 1987 [FR] France .................. 87 15689

[51] Int. Cl.$^5$ .......................... G02B 6/36; G02B 7/26
[52] U.S. Cl. ...................... 350/96.20; 350/96.17
[58] Field of Search ................ 350/96.17, 96.20

[56] References Cited

U.S. PATENT DOCUMENTS

| | | | |
|---|---|---|---|
| 4,186,994 | 2/1980 | Denkin et al. | 350/96.17 |
| 4,479,698 | 10/1984 | Landis et al. | 350/96.17 |

Primary Examiner—William L. Sikes
Assistant Examiner—Robert E. Wise
Attorney, Agent, or Firm—Sughrue, Mion, Zinn, Macpeak & Seas

[57] ABSTRACT

The chip of semiconductor material (48) of an opto-electronic component is optically coupled inside a housing (40) to a length of optical fiber (43). This length of optical fiber (43) is fixed to the housing (40) at three points: a rear holding point (50) in the vicinity of the end of the optical fiber (43) in order to hold said end in its coupling position; a front holding point placed on the length of optical fiber (43) where it passes through the housing (tube 42) in order to withstand forces exerted on the length of optical fiber (43) from outside the housing; and an intermediate holding point (51) placed on the optical fiber between the front and rear holding points in order to attenuate the transmission to the rear holding point (50) of forces exerted on the length of optical fiber (43) at the front holding point by virtue of the housing (40) deforming.

9 Claims, 5 Drawing Sheets

COUPLING DEVICE BETWEEN IN OPTICAL FIBER AND AN OPTO-ELECTRONIC COMPONENT

This is a continuation of application No. 07/269,399 filed Nov. 10, 1988, now abandoned.

The present invention relates to coupling devices comprising an opto-electronic component in the form of a chip of semiconductor material mounted in a housing and optically coupled to a lead-in length of optical fiber passing through the wall of the housing.

BACKGROUND OF THE INVENTION

Optical coupling between the opto-electronic component and the length of optical fiber requires the end of the length of optical fiber to be positioned extremely accurately relative to the chip of semiconductor material constituting the opto-electronic component, with an error of about 1 $\mu$m being sufficient to give rise to coupling loss of more than 3 dB if the fiber is a monomode fiber. Once such positioning has been obtained, it must be retained and held by the means fixing the component and the length of fiber to the inside of the housing.

In general, the procedure begins by disposing the chip of semiconductor material constituting the opto-electronic component on a base, fixing the base on the bottom of the housing, and then adjusting the positioning of the end of the length of optical fiber relative to the chip of semiconductor material using a micromanipulator while being guided by changes in the optical coupling efficiency obtained.

After that, the length of fiber is fixed. This is a difficult operation since fixing the fiber must give rise to as little change as possible in the positioning of the end of the length of fiber relative to the chip of semiconductor material constituting the opto-electronic component. One way of doing this is described is described in French patent application filed under the number 85 07 793 and consists in fixing the length of fiber initially to a first point, referred to as a "rear" holding point, which is close to the end facing the chip of semiconductor material, and then at a second point, referred to as a "front" holding point, situated when it goes through the wall of the housing. The first, or rear holding point is constituted by solder which makes it possible to perform subsequent readjustment and end up with a final position which is close to the initial position, however it holds the fiber in a manner which is not very secure and which is not strong enough, thereby allowing elastic or plastic displacement to take place, moving the end of the length of fiber away from the optimum coupling area whenever the lead-in length of fiber is subjected to the slightest stress. The second, front holding point is intended to withstand the forces exerted on the length of fiber from outside the housing. It is made more strongly than the first by soldering the fiber where it passes through the wall inside a feedthrough tube which is itself bonded to the wall of the housing.

This method of fixing serves to maintain good optical coupling between the opto-electronic component and the length of fiber so long as forces are not exerted on the length of optical fiber inside the housing.

Unfortunately, under common conditions of use, such forces arise because of the differences in expansion between the length of fiber inside the housing and the bottom of the housing itself whenever there is a change in temperature, because of the mechanical deformation to which the housing is subjected, in particular while it is being fixed in place, and because of traction forces exerted on the length of fiber from outside the housing.

French patent application filed under the number 85 10 479 describes how to eliminate traction or compression forces exerted on the length of fiber inside the housing in the event of the housing expanding or contracting thermally along the axis of the length of fiber, and this is done by providing the front holding point situated where the fiber passes through the wall of the housing by means of a temperature compensation arm which compensates for differences in expansion between the bottom of the housing and the length of fiber inside the housing. Apart from the fact that the temperature compensation arm is difficult to make, this method of fixing suffers from the drawback of leaving unaltered other forces exerted inside the housing by the length of fiber on its rear holding point, for example forces due to bimetallic strip type bending with change in temperature or to deformation of the housing due to purely mechanical origins.

The object of the present invention is to reduce the forces exerted by the length of fiber on its rear holding point under common conditions of storage and use of the housing in order to conserve optimum optical coupling between the length of fiber and the opto-electronic component throughout the useful lifetime of the coupling device.

SUMMARY OF THE INVENTION

The present invention provides a coupling device between an optical fiber and an opto-electronic component in the form of a chip of semiconductor material comprising, in addition to said optical fiber and said opto-electronic component, a housing containing said component and into which said optical fiber penetrates through a wall, with one end of the fiber coming into optical coupling with the chip of semiconductor material, and means for fixing the optical fiber to the housing at a rear holding point placed directly on the optical fiber in the vicinity of its end which is optically coupled with the chip of semiconductor material in order to hold said end in its coupling position, and at a front holding point placed directly on the optical fiber where it passes through the wall of the housing in order to withstand forces exerted on the optical fiber from outside the housing, and at least one intermediate holding point placed directly on the fiber between the rear holding point and the front holding point in order to attenuate the transmission to the rear holding point of the forces exerted on the optical fiber at the front holding point by deformation of the housing.

It is advantageous to fix the optical fiber to the housing at the intermediate holding point, as at the rear holding point, by means of solder, and to place the intermediate holding point at a distance from the front holding point which is substantially equal to two-thirds of the distance between the front and rear holding points.

BRIEF DESCRIPTION OF THE DRAWINGS

An embodiment of the invention is described by way of example with reference to the accompanying drawings, in which.

Figure 1:
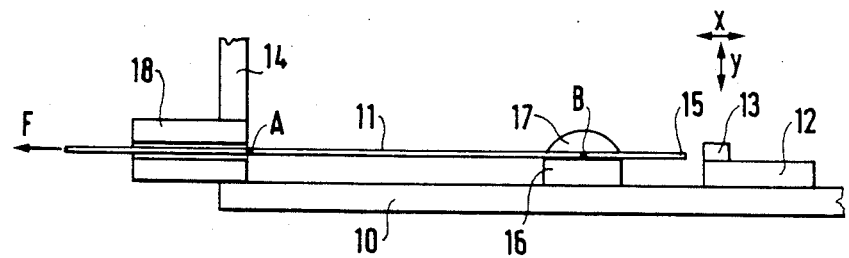
FIG. 1 is a theoretical diagram showing how a lead-in length of optical fiber is fixed at two holding points in a prior art optical coupling device.
Figure 3:
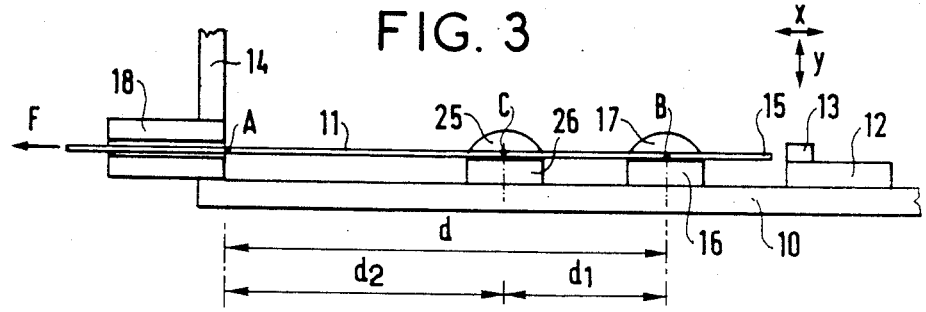
Figure 4:
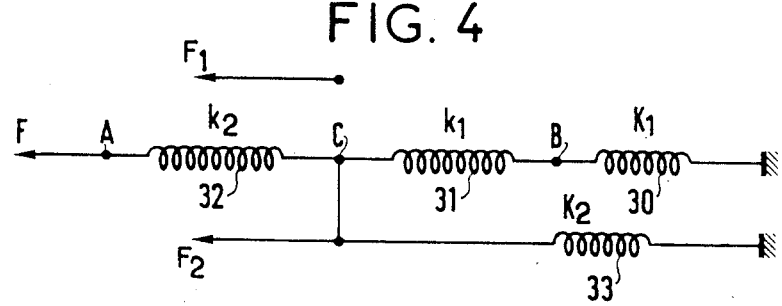
Figure 5:
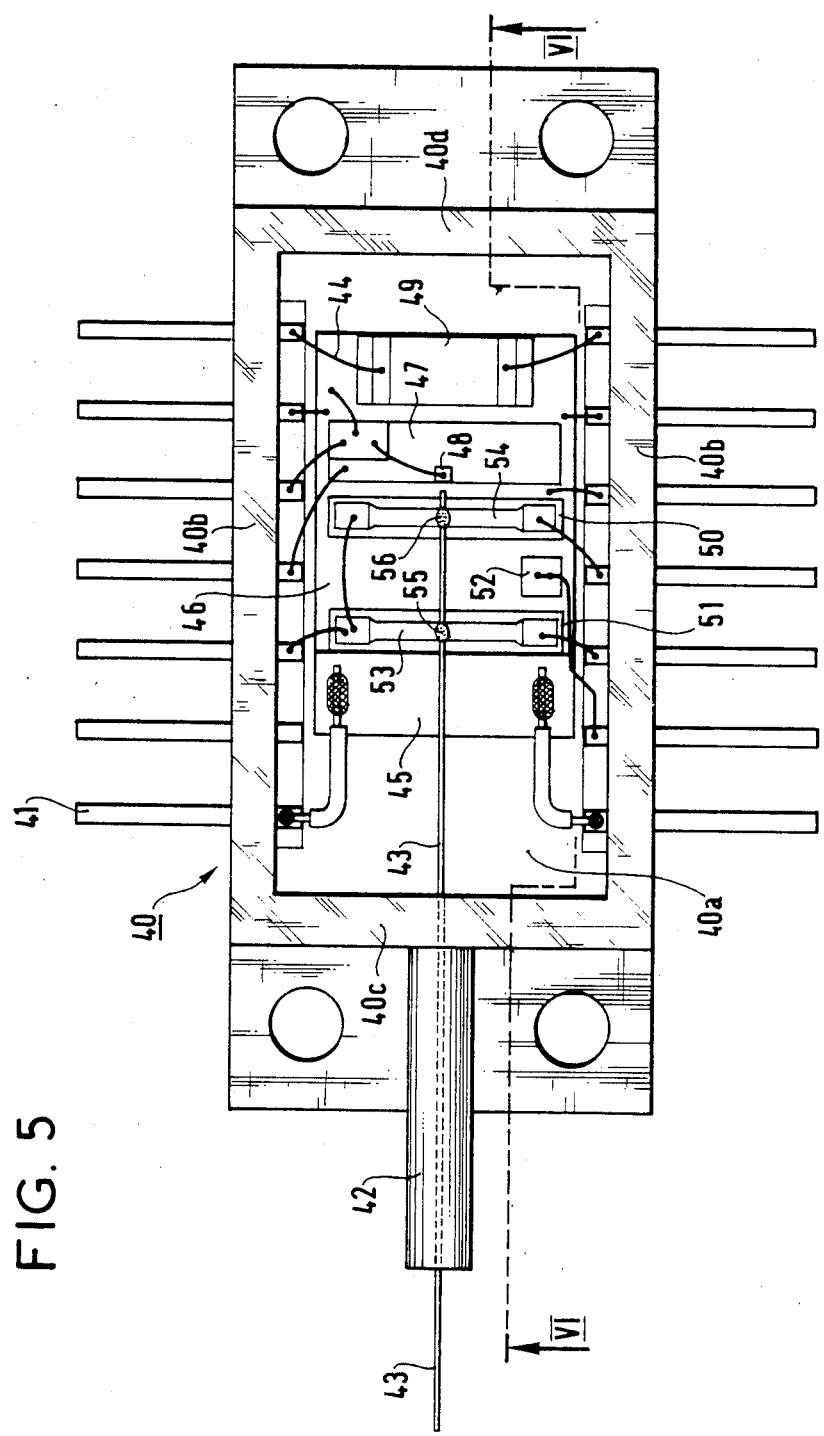
Figure 6:
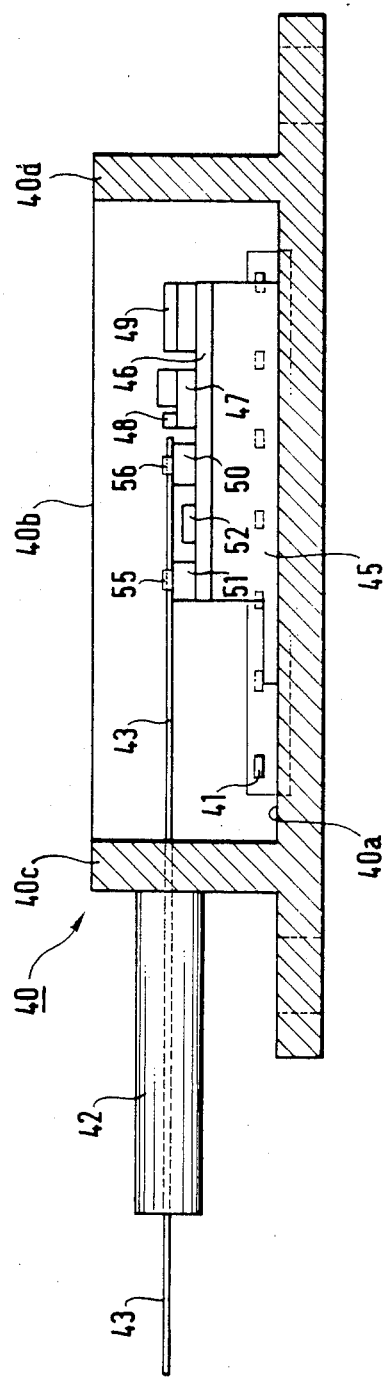
Figure 7A:
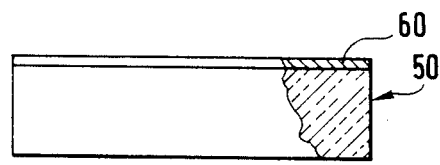
Figure 7B:
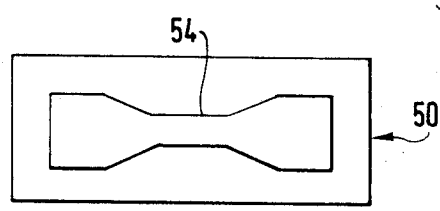
Figure 7C:
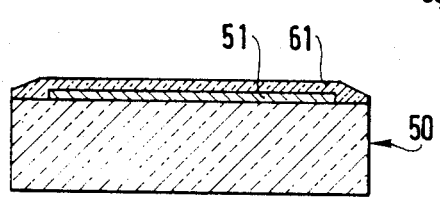
Figure 7D:
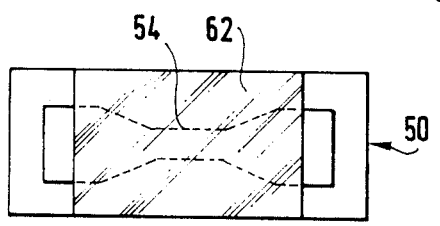
Figure 7E:
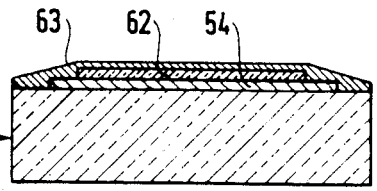
Figure 7F:
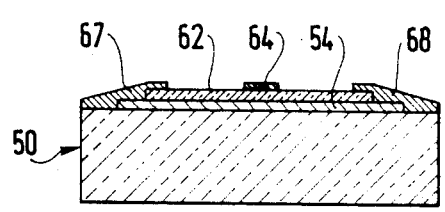
Figure 7G:
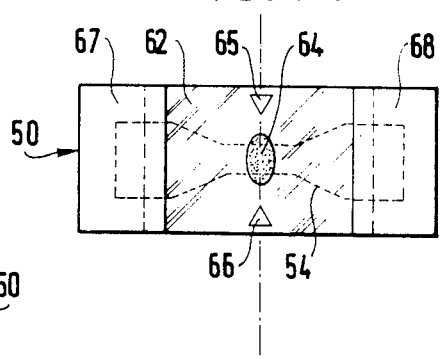
Figure 8:
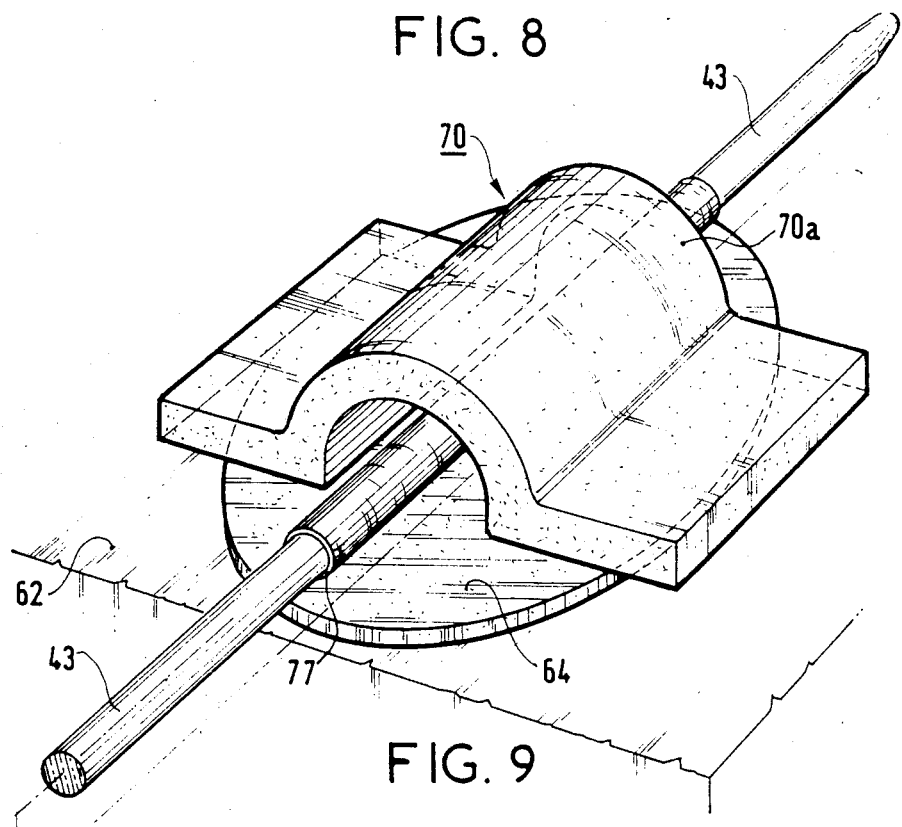
Figure 9:
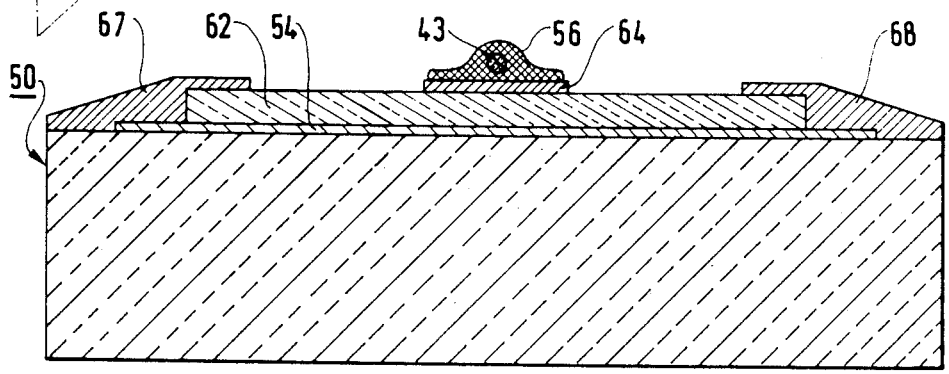

FIB. 2 is a mechanical equivalent diagram used in deriving equations for the mechanical system constituted by fixing the length of optical fiber at the two holding points shown in FIG. 1;

FIB. 3 is a theoretical diagram of a length of optical fiber which is fixed at three holding points in an optical coupling device in accordance with the invention;

FIG. 4 is a mechanical equivalent diagram for deriving equations for the mechanical system constituted by fixing the length of optical fiber at the three holding points shown in FIG. 3;

FIG. 5 is a plan view of the housing of a coupling device in accordance with the invention showing the semiconductor material chips of an opto-electronic component inside the housing and coupled to a lead-in length of optical fiber which is fixed at three holding points: front; intermediate; and rear;

FIG. 6 shows the housing of FIG. 5 in vertical section on line VI—VI of FIG. 5;

FIGS. 7A to 7G show a pad constituting a rear or an intermediate holding point for the optical fiber during successive stages for forming a surface resistance on the pad, with FIGS. 7A, 7C, 7E, and 7F being vertical sections and FIG. 7B, 7D, and 7G being plan views;

FIG. 8 is a perspective view of a keying area for soldering purposes placed on a holding pad for a length of optical fiber and as shown in section and plan views in FIGS. 7F and 7G; and FIG. 9 is a view of a holding pad for the length of optical fiber after the length has been fixed by soldering in accordance with the preparations shown in FIG. 8.

MORE DETAILED DESCRIPTION

FIG. 1 is a theoretical diagram showing a length of optical fiber which is fixed at two holding points as is done conventionally in prior art coupling devices. The figure shows a horizontal slab 10 representing the bottom of the housing of a coupling device shown in section on a plane containing that portion of the length of optical fiber 11 which penetrates into the housing. At one end, the slab 10 carries a base 12 which supports the chip of semiconductor material 13 constituting an opto-electronic component. Its other end includes a vertical edge 14 representing the side wall of the housing through which the length of optical fiber 11 passes. The fiber extends inside the housing parallel to the slab 10 with the end 15 of the fiber being placed in the vicinity of the chip of semiconductor material 13 in an optimum position for optical coupling. The fiber is fixed to the housing, i.e. to the slab 10, in the vicinity of its end 15 at a holding point referred to as a "rear" holding point, and where it passes through the side wall of the housing at a holding point referred to as a "front" holding point.

At the rear holding point, the length of optical fiber 11 stands on the slab 10 via a pad 16 to which it is fixed by a drop of solder 17. At the front holding point, the length of optical fiber 11 is soldered inside the feedthrough tube 18 which passes through and is bonded to the side wall of the housing.

The letter A designates the center of application of forces exerted by the housing on the length of optical fiber 11 at the front holding point and the letter B designates the center of application of the forces exerted by the length of optical fiber 11 on its fixing to the rear holding point. The letter x designates the axial direction of the length of fiber inside the housing in the absence of any deformation to the housing altering the relative positions of the front and rear holding points, and the letter y designates the direction perpendicular to the direction x and lying in the plane of the figure.

During mechanical deformation of the housing giving rise to displacement along the x-direction and displacement along the y-direction of the front holding point, giving rise to a change in the relative positions of the front and rear holding points, the portion of the length of fiber 11 situated between the front and rear holding points is subject both to bending and also to elongation or contraction. To a first approximation, it is possible to consider the effect of displacing the front holding point along the x-direction separately from the effect of displacing said point along the y-direction. Given the cylindrical symmetry of the system, it may also be observed that the way it behaves when the front holding point is displaced along the y-direction is representative of the way it behaves during any displacement of the front holding point along any direction perpendicular to the x-direction.

Figure 2:
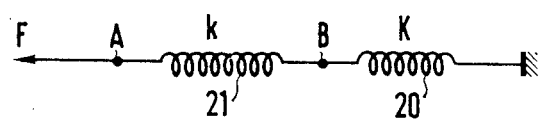

A displacement X along the x-direction of the front holding point gives rise to a displacement $Xb$ along said x-direction of the rear holding point, said displacement $Xb$ degrading the coupling. In this case, a force F is exerted on the length of optical fiber from point A parallel to the x-direction, and so long as it remains within the domain of elastic deformation, the mechanical system constituted by the fixing of the length of optical fiber at two points is then equivalent, as shown in FIG. 2, to a system comprising two traction/compression springs 20 and 21 connected in series to the slab 10 and subjected to the force F, with one of the springs, 20, having a stiffness K and connecting the slab 10 to the point B to simulate the elasticity in traction and compression of the fixing at the rear holding point, and with the other spring, 21, having stiffness k and interconnecting the points B and A to simulate the elasticity in traction and compression of that portion of the length of optical fiber which is situated between the front and rear holding points. At equilibrium, this system satisfies the equation:

$$KXb = k(X - Xb)$$

which may be rewritten:

$$Xb = \frac{X}{1 + (K/k)}$$

This second equation shows that to keep $Xb$ small compared with X, it is necessary for the fixing stiffness at the rear holding point to be large compared with the stiffness k of the portion of optical fiber, which condition is intuitively understandable, in which case $Xb$ is then given, in substance, by the following equation:

$$Xb = \frac{k}{K} X$$

In practice, the stiffness in traction and in compression of the length of fiber is about 100 times smaller than the stiffness of the fixing to the rear holding point, such that the displacement $Xb$ is 100 times smaller than the displacement X, i.e. substantially 100 times smaller than the variation in length of the optical fiber between the front and rear fixing points. Unfortunately, this is still too great a displacement to prevent the deformation to which the housing is subjected in normal utilization from giving rise to considerable variations in optical coupling.

A displacement Y along the y-direction of the front holding point causes the portion of optical fiber situated between the front and rear holding points to bend. Two different forces are then exerted on the rear fixing point: firstly a force F' parallel to the y-direction and corresponding to the return force of the bending spring constituted by that portion of the length of optical fiber which is situated between the front and rear holding points, and secondly a moment M due to the bending couple.

In practice, the force F' can be neglected. For a length of silica fiber having a diameter of 125 μm and for a distance d of about 10 mm between the points A and B (which values are commonly encountered in practice), the bending stiffness of the portion of fiber situated between the front and rear holding points is about $10^{-4}$ times the stiffness in traction and in compression of the length of fiber between these two points. In order for this force to become non-negligible, it would be necessary for the displacement Y to considerably exceed the limit at which the length of fiber would break.

The mechanical system constituted by fixing the length of optical fiber at two points can thus be modelled by a two spring system analogous to that shown in FIG. 2, except that in this case the springs are torsion springs subjected to the moment M. At equilibrium, this system satisfies the equation:

$$G\theta b = g(\theta - \theta b)$$

where G is the constant of the torsion spring simulating the bending elasticity of the fixing at the rear holding point, g is the constant of the torsion spring simulating bending elasticity of the portion of optical fiber situated between the front and rear holding points, θ is the ratio of Y/d (which in practice is small compared with 1 and can be taken to be the angular deflection of the length of optical fiber at its front holding point), and θb is the angular deflection of the length of optical fiber at its rear holding point caused by the displacement Y.

This equation can be rewritten:

$$\theta b = \frac{\theta}{1 + (G/g)}$$

which shows that for θb to be small compared with θ, it is necessary for the constant G to be large compared with the constant g, in which case θb is substantially given by:

$$\theta b = \frac{g}{G} \theta = \frac{gY}{Gd}$$

In practice, the constant G is about 100 times greater than the constant g such that the angular deflection θb is about 100 times smaller than the ratio Y/d. Unfortunately, this is not enough to ensure that deformations of the housing which cause the length of fiber to bend and which occur, in particular, when the housing is clamped to a support, will not also give rise to considerable variations in optical coupling.

FIG. 3 is a theoretical diagram of a length of optical fiber which is fixed at three holding points as is done in a coupling in accordance with the invention. FIG. 3 shows the same items as FIG. 1 using the same references, and also shows an additional fixing of the length of fiber 11 at an intermediate holding point where it is held in place by a drop of solder 25 on a pad 26 fixed to the slab 10.

The letter C again designates the center of application of forces exerted by the length of optical fiber on its fixing, this time at the intermediate holding point.

The effects of displacing the front holding point along the x-direction and then along the y-direction are considered below in succession as they are above for the case where the length of optical fiber is fixed at two holding points only.

A displacement X along the x-direction of the front holding point will give rise to displacements Xc and Xb in the same direction of the intermediate and rear holding points respectively. While remaining within the domain of elastic deformation, the mechanical system constituted by this fixing of the length of optical fiber at three holding points, namely the "front", the "rear", and the "intermediate" points, is equivalent to a system of four traction/compression springs attached to the slab 10 and subjected to the force F, as shown in FIG. 4. Three of the springs 30, 31, and 32 are connected in series, while the fourth spring 33 is connected in parallel with two of the first three springs 30 and 31. The first spring 30 of stiffness K1 connecting the slab 10 to the point B simulates the traction and compression elasticity of the fixing at the rear holding point. The second spring 31 of stiffness k1 interconnecting points B and C simulates the elasticity in traction and compression of the portion of the length of optical fiber 11 which is situated between the rear and intermediate holding points. The third spring 32 of stiffness k2 interconnecting points C and A simulates the elasticity in traction and compression of that portion of the length of optical fiber 11 which is situated between the intermediate and front holding points. The fourth spring 33 of stiffness K2 connecting the slab 10 to the point C simulates the elasticity in traction and compression of the fixing at the intermediate holding point. That component of the force F which is responsible for the elastic deformation of the fixing at the intermediate holding point is designated F2, and the remaining component of the force F is designated F1, such that the following system of equations can be written for equilibrium conditions:

$$F = k2(X - Xc)$$

$$F = F1 + F2$$

$$F2 = K2Xc$$

$$F1 = K1Xb$$

$$F1 = k1(Xc - Xb)$$

By eliminating the terms F, F1, F2, and Xc, the following equation can be deduced:

$$\frac{X}{Xb} = 1 + \frac{K1K2}{k1k2} + \frac{K1 + K2}{k2} + \frac{K1}{k1}$$

Since the stiffnesses k1 and k2 for the portions of optical fiber are inversely proportion to their lengths, it is possible to write:

$$k1 = k(d/d1) \text{ and } k2 = k(d/d2)$$

where d1 is the distance between the points B and C, and d2 is the distance between the points A and C.

The equation then becomes:

$$\frac{X}{Xb} = 1 + \frac{K1K2 \cdot d1d2}{k^2 d^2} + \frac{(K1 + K2)d2}{kd} + \frac{K1d1}{kd} \quad (1)$$

which, given that the third or "intermediate" holding point lies between the front and rear holding points, i.e.:

$$d1 = d - d2$$

can be written:

$$\frac{X}{Xb} = -\frac{K1K2\, d2^2}{k^2 d^2} + \left(\frac{K1K2}{k^2 d} + \frac{K2}{kd}\right)d2 + \frac{K1}{k} + 1$$

The optimum position for the intermediate holding point is the position in which the term X/Xb is at a maximum, i.e. the position in which the derivative of the above equation with respect to d2 (the distance of the intermediate holding point from the front holding point) becomes zero. The value of this derivative is:

$$-\frac{2K1K2\, d2}{k^2 d^2} + \frac{K1K2}{k^2 d} + \frac{K2}{kd}$$

which can be rewritten:

$$\frac{K1K2}{k^2 d}\left[-\frac{2d2}{d} + 1 + \frac{k}{K1}\right]$$

and this is equal to zero when:

$$\frac{d2}{d} = \frac{1}{2}\left(1 + \frac{k}{K1}\right)$$

Since, in practice, the coefficient k/K1 is much less than 1, the optimum position for the intermediate holding point is substantially the middle position:

$$d1 = d2 = d/2$$

When the intermediate point is in the middle, the elastic displacement Xb of the rear holding point can be expressed as a function of the displacement X by the following approximate relationship:

$$Xb = 4\frac{k^2}{K1K2} X$$

In order to facilitate comparison with conventional fixing using two holding points, it may be assumed that the fixing at the intermediate holding point has the same stiffness in traction and compression as the fixing at the rear holding point:

$$K2 = K1 = K$$

In which case:

$$Xb = 4(k/K)^2 X$$

Using the practical assumption of the ratio K/k being about 100, it can be seen that the displacement Xb of the rear holding point is twenty five times less than it would be for fixing using two holding points, whereas it could have been expected that adding an intermediate holding point would only reduce the displacement Xb by one half, as is indeed substantially the case when the intermediate holding point is moved close to the rear holding point as can be seen from equation (1) by making d1 tend to zero and d2 tend to d.

In practice, it can be deduced from equation (1) that the ratio X/Xb varies little so long as the distance d2 of the intermediate holding point relative to the front holding point lies within the range 0.3d to 0.7d.

If a displacement Y along the y-direction of the front holding point is now considered for the length of optical fiber being fixed at three holding points, it is possible to ignore the force parallel to the y-direction exerted on the rear holding point as it is for fixing using only two holding points. While remaining within the domain of elastic deformation, the mechanical system constituted by said three-point fixing can be modelled by a system of four springs analogous to that shown in FIG. 4, except that the springs are now torsion springs subjected to the moment M. By designating the component of said moment which is responsible for elastic deformation of the fixing at the intermediate holding point at M2, and the remaining component of the moment M as M1, with $\theta c$ being the angular deflection of the length of fiber at the intermediate holding point, G1 and G2 being the constants of the torsion springs simulating the bending elasticity of the fixings at the rear and the intermediate holding points respectively, and g1 and g2 being the constants of the torsion springs simulating the bending elasticity of the portions of optical fibers situated between the rear and the intermediate holding points and between the intermediate and the front holding points respectively, the following system of equations can be written to describe equilibrium conditions:

$$M = g2(\theta - \theta c)$$

$$M = M1 + M2$$

$$M2 = G2\theta c$$

$$M1 = G1\theta b$$

$$M1 = g1(\theta c - \theta b)$$

By eliminating the terms M, M1, M2, and $\theta c$, the following equation can be written:

$$\frac{\theta}{\theta b} = 1 + \frac{G1G2}{g1g2} + \frac{G1 + G2}{g2} + \frac{G1}{g1} \quad (2)$$

since the constants g1 and g2 are inversely proportional to the length of the portions of optical fiber to which they relate, it is possible to write:

$$g1 = g(d/d1) \text{ and } g2 = g(d/d2)$$

Substituting these values into equation (2) for g1 and g2, and Y/d for $\theta$, gives:

$$\frac{Y}{\theta b} = d2 + \frac{G1G2d1d2^2}{g^2d^2} + \frac{(G1+G2)d2^2}{gd} + \frac{G1d1d2}{gd} \quad (3)$$

and given that:

$$d1 = d - d2$$

the following equation may be written:

$$\frac{Y}{\theta b} =$$

$$d2\left[-\frac{G1G2d2^2}{g^2d^2} + \left(\frac{G1G2}{g^2} + \frac{G2}{gd}\right)d2 + \frac{G1}{g} + 1\right]$$

The optimum position for the intermediate holding point is the position in which the ratio $Y/\theta b$ is at a maximum. The derivative relative to d2 of the right-hand part of the above equation can be written:

$$-3\frac{G1G2}{g^2d^2}d2^2 + 2\left(\frac{G1G2}{g^2d} + \frac{G2}{gd}\right)d2 + \frac{G2}{g} + 1$$

When solved for d2, this expression has two roots, and the ratio $Y/\theta b$ is at a maximum for the root whose value is:

$$\frac{d}{3}\left[1 + \sqrt{1 + 2\frac{g}{G1} + 3\frac{g}{G2} + 3\frac{g^2}{G1G2} + \frac{g^2}{G1^2} + \frac{g}{G1}}\right]$$

Since the terms g/G1 and g/G2 are, in practice, very small compared with 1, the optimum position of the intermediate holding point is thus substantially given by:

$$d2 = (2/3)d$$

For this value of d2, the angular deflection $\theta b$ can be expressed as a function of the displacement Y by the following approximate equation:

$$\theta b = \frac{27}{4}\left(\frac{g^2}{G1G2}\right)\frac{Y}{d}$$

In order to facilitate comparison with conventional fixing using only two holding points, it may be assumed that the fixing at the intermediate holding point has the same bending stiffness as the fixing at the rear holding points, i.e.

$$G_1 = G_2 = G$$

in which case:

$$\theta b = \frac{27}{4}\left(\frac{g}{G}\right)^2\frac{Y}{d}$$

Returning to the practical assumption that the ratio G/g has a value of about 100, it can be seen that the angular deflection $\theta b$ of the length of fiber at the rear holding point is substantially fifteen times smaller than using a fixing having two holding points only, whereas it could have been expected that adding an intermediate holding point would only reduce the angular deflection $\theta b$ by one half, which is substantially what does indeed happen when the intermediate holding point is moved close to the rear holding point as can be deduced from equation (2) by making d1 tend to zero and d2 to d.

In practice, it can be deduced from equation (3) that the ratio $Y/\theta b$ varies little so long as the distance d2 remains within the range 0.5d and 0.8d.

Overall, the effects of the forces exerted by the fiber on the fixing at the rear holding point vary little so long as the distance d2 lies within the range 0.5d to 0.7d. Given this latitude, it is possible to optimize the position of the intermediate holding point within this range by taking account of other factors such as the risk of breaking the length of optical fiber between the front and intermediate holding points, which risk increases as these two holding points move towards each other, and the advantage in placing the intermediate holding point and the rear holding point on a single block constituted, as described below, for example, by a plate fixed on a Peltier module stabilizing the temperature of the opto-electronic component, assuming such a module exists. This advantage results from the need to avoid giving rise to relative displacement between the intermediate holding point and the rear holding point since that would give rise to new forces acting directly on the rear fixing.

Given these considerations and, where applicable, considerations concerning the dimensions of the Peltier module, the preferred location for the intermediate holding point is situated at a distance from the front holding point which is substantially equal to two thirds of the distance between the rear holding point and the front holding point, i.e.:

$$d2 = (2/3)d$$

In addition, in order to further stabilize optical coupling, the rear and intermediate holding points should be symmetrically disposed lengthwise about the middle of the housing, i.e. along the x-direction.

FIGS. 5 and 6 show a practical implementation of these dispersions. They show the housing 40 of the coupling to be made of a metal alloy suitable for bonding to glass or ceramic and including a horizontal bottom 40a, two vertical side walls 40b, having electrical connection leads such as 41 passing therethrough together with glass or ceramic electrical insulation, a front wall 40c provided with a horizontal feedthrough tube 42 extending up a fraction of its height and serving to allow a lead-in length of optical fiber 43 to be inserted into the housing, and a rear wall 40d. Conductor wires such as 44 provide electrical connections inside the housing between the leads 41 and various components.

A slab 45 constituted by a Peltier effect module for cooling and regulating temperature of the opto-electronic component is bonded to the bottom 40a of the housing. The slab may alternatively be constituted by a heat conducting block acting as a heat dissipator. An electrically insulating ceramic plate 46 which is a good conductor of heat, e.g. beryllium oxide BeO covers at least a portion of the slab 45 and constitutes a fixing plateau is about 10 mm long by 7 mm wide for receiving the opto-electronic component and the part for holding the end of the length of optical fiber 43 which is optically coupled therewith.

A base 47 in the form of a rectangular strip is placed on the plateau 46 in the vicinity of the mid-portion thereof and towards the rear wall 40d of the housing, and it extends perpendicularly to the direction in which the length of optical fiber 43 extends. It is made of the same heat conducting ceramic material as the plateau 46. It is soldered thereto and comes level with the feedthrough tube 42, and on the axis thereof it carries a chip of semiconductor material 48 which is soldered thereto and which constitutes a laser diode emitting a main light beam towards the front of the housing and an auxiliary light beam towards the rear.

A photodiode 49 is disposed on the plateau 46 behind the base 47 in the field of the auxiliary light beam from the laser diode and delivers a signal representative of the intensity of the light beam for use by a circuit for regulating the operating point of the laser diode.

Two rectangular pads 50 and 51 are aligned on the plateau 46 in front of the base 47 and each of them extends perpendicularly to the direction of the length of optical fiber 43. They are level with the feedthrough tube 42 and serve to provide the rear and intermediate holding points for the length of optical fiber 43. To make this possible, they are electrically insulating and each of them has an electrical resistance 54 or 53 running along the top thereof and covered with a drop of solder 56 or 57 which, after being melted, spreads around and over the length of optical fiber 43 and holds it prisoner.

The rectangular pad 50 is the pad closest to the end of the optical fiber 43 which is optically coupled to the chip of semiconductor material 48 and it is used for the rear holding point. It is at a distance of about 10 mm from the inside end of the feedthrough tube 42 which serves as the front holding point. The rectangular pad 51 used for the intermediate holding point is at about 3.2 mm from the pad 50, with the two pairs 50 and 51 being at equal distances from the lengthwise middle section through the housing 40.

A thermistor 52 placed between the two pads 50 and 51 delivers a temperature-monitoring signal for use by a circuit for regulating the Peltier effect module constituted by the slab 45. It may be omitted when such a module is not provided and is replaced by a thermally conducting block.

The rectangular pads 50 and 51 are made of a ceramic which is a poor conductor of heat so that the heat dissipated by the resistances 54 and 53 mounted thereon serves essentially for melting the drops of solder 56 and 55. The pads are made, for example, of a vitroceramic sold under the trademark MACOR by Minnesota Rubber France, having a thermal conductivity of 0.02 W/cm.K.

For the purpose of forming the resistances 54 and 53, the rectangular pads 50 and 51 receive the following treatments in succession as illustrated in FIGS. 7A to 7G for rectangular pad 50:

preparing the surface (which must be smooth) and depositing a layer having a thickness of about 130 nm (nanometers) of NiCr alloy in order to constitute a thin layer 60 of resistive metal material (FIG. 7A);

etching said layer so as to leave a portion constituting a heating resistance 54 (FIG. 7B);

depositing a layer of silica 61 to a thickness of about 700 nm (FIG. 7C) constituting electrically insulating protection;

etching said layer so that the remaining portion 62 (FIG. 7D) reveals the ends of the heating resistance 54;

depositing a keying layer of NiCr alloy to a thickness of about 100 nm and covering it with a layer of gold 63 to a thickness of about 500 nm (FIG. 7E); and etching said layer 63 so that the remaining portions constitute a keying area 64 for soldering two alignment markers 65 and 66 for the length of fiber and for soldering the terminals 67 and 68 of the heating resistance 54 (FIGS. 7F and 7G).

The keying area 64 for soldering is oval in shape occupying about 600 μm by 900 μm and is oriented along the axis of the length of optical fiber 43 between the alignment markers 65 and 66 which are constituted by two arrowheads pointing along the axis of the length of optical fiber on either side of and towards the oval of the keying area 64.

As shown in FIG. 8, a preformed bridge strip of solder 70 is placed over the length of optical fiber 43 on the keying area 64. This strip is about 0.05 mm thick and may be constituted by an indium-lead-silver alloy (80% indium, 15% lead, and 5% silver) having a low melting point.

The portion of the length of optical fiber 43 which, at the keying area 46, passes beneath the arch 70a of the preformed strip 70 is coated with a metal keying sleeve 77 which may be constituted by a layer of NiCr alloy itself coated with a layer of gold, like the keying area 64.

The length of optical fiber 43 is fixed to the pad 50 as shown in FIG. 9 which shows the final configuration after the soldering has been performed.

This is done by injecting an electrical current into the resistance 54 which heats the strip of solder until it melts, and thus coats the length of optical fiber 43 so as to adhere simultaneously to the keying area 64 on the pad 50 and to the metal keying sleeve 77 on the optical fiber 43.

The mounting of the length of optical fiber 43 in the housing 40 of the coupling is the last action to be performed thereon. It is done initially by inserting one end of the length of optical fiber 43 through the feedthrough tube 42 into the housing 40. This end is previously prepared with metal keying sleeves 77 at the approximate locations of the pads 50 and 51. Thereafter the end of the fiber is brought into the vicinity of the position in which it couples optically with the chip 48 of semiconductor material. Once this has been done, the end of the length of optical fiber 43 is held inside the housing 40 by the clamps of a micromanipulator which grasps it in the gap between the opening of the feedthrough tube 42 and the pad 51 which defines the position of the intermediate holding point, at a distance from the pad 50 so as to allow the end of the fiber to bend elastically without breaking under the effect of the solder on the pad 50 shrinking. The micromanipulator brings the end into its optimum optical coupling position by guidance from the variations in optical coupling obtained, after which it is raised into a soldering position for taking account of the shrinkage of the solder on the pad 50. The preformed strip of solder is then put into place on the length of optical fiber 43 over the keying area 64 of the pad 50 and soldering is performed at said pad 50, thereby fixing the length of optical fiber 43 at its rear holding point.

Once the rear holding point has been fixed, the micromanipulator is removed, a preformed strip of solder is put into place over the length of optical fiber 43 at the keying area of the pad 51, and soldering is performed at said pad 51, thereby fixing the length of fiber 43 to the intermediate holding point.

Once the length of optical fiber 43 has been fixed to the rear and intermediate holding points, it is soldered inside the feedthrough tube 42, thereby fixing its front holding point and terminating assembly.

Without going beyond the scope of the invention, it is possible to modify various dispositions or replace various means by equivalent means. In particular, it is possible to use more than two pads for fixing the length of cable inside the housing, in which case there will be a plurality of intermediate holding points.

We claim:

1. A coupling device between an optical fiber and an opto-electronic component in the form of a chip of semiconductor material comprising, in addition to said optical fiber and said opto-electronic component, a housing containing said component and into which said fiber penetrates through a wall, with one end of the fiber coming into optical coupling with the chip of semiconductor material, and means for holding the optical fiber, by fixing it to the housing, at least three spaced holding points, said holding points comprising a rear holding point placed directly on the optical fiber in the vicinity of its end which is optically coupled with the chip of semiconductor material in order to hold said end in its coupling position, a front holding point placed directly on the optical fiber where it passes through the wall of the housing in order to withstand forces exerted on the optical fiber from outside the housing, and at least one intermediate holding point placed directly on the optical fiber between the rear holding point and the front holding point in order to attenuate the transmission to the rear holding point of the forces exerted on the fiber at the front holding point by deformation on the housing.

2. A coupling device according to claim 1, wherein the intermediate holding point is placed at a distance from the front holding point lying in the range 0.5 times to 0.7 times the distance between the front and rear holding points.

3. A coupling device according to claim 1, wherein the intermediate holding point and the rear holding point are placed on a common slab.

4. A coupling device according to claim 1, wherein the intermediate holding point and the rear holding point are placed on pads, the length of optical fiber is provided with a metal keying sleeve at the approximate location of each of said pads said pads are each provided with a keying area underlying the metal keying sleeve and in contact therewith, and a mass of solder at each said pad, affixes the length of fiber to respective pads at the intermediate and rear holding points via said metal keying sleeves.

5. A coupling device according to claim 4, wherein each metal keying sleeve is constituted by a layer of NiCr alloy coated with a layer of gold, and said keying areas comprise a layer of gold in direct contact with the layer of gold on the NiCr alloy keying sleeve.

6. A coupling device according to claim 1, wherein said at least one intermediate holding point is a single intermediate holding point placed at a distance from the front holding point lying in the range of 0.3 times to 0.7 times the distance between the front and rear holding points.

7. A coupling device according to claim 1, wherein said at least one intermediate holding point is a single intermediate holding point placed at a distance from the front holding point lying in the range of 0.5 times to 0.8 times the distance between the front and rear holding points.

8. A coupling device according to claim 1, wherein said at least one intermediate holding point is a solder connection.

9. A coupling device according to claim 1, wherein the rear holding point is a solder connection.

* * * * *